United States Patent
Watanabe et al.

(10) Patent No.: US 11,364,798 B2
(45) Date of Patent: Jun. 21, 2022

(54) SHIFT DEVICE

(71) Applicant: KABUSHIKI KAISHA TOKAI-RIKA-DENKI-SEISAKUSHO, Aichi-ken (JP)

(72) Inventors: Hironori Watanabe, Aichi-ken (JP); Koji Imai, Aichi-ken (JP); Yohei Nakano, Aichi-ken (JP); Munetoshi Makimura, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 56 days.

(21) Appl. No.: 16/225,304

(22) Filed: Dec. 19, 2018

(65) Prior Publication Data

US 2019/0202288 A1 Jul. 4, 2019

(30) Foreign Application Priority Data

Dec. 28, 2017 (JP) .............................. JP2017-254801

(51) Int. Cl.
*F16H 59/10* (2006.01)
*B60K 20/02* (2006.01)
*F16H 63/30* (2006.01)
*B60K 20/06* (2006.01)
*F16H 61/24* (2006.01)

(52) U.S. Cl.
CPC .............. *B60K 20/02* (2013.01); *B60K 20/06* (2013.01); *F16H 59/10* (2013.01); *F16H 63/30* (2013.01); *F16H 2061/242* (2013.01); *F16H 2063/3086* (2013.01)

(58) Field of Classification Search
CPC ... B60K 20/02; F16H 2061/242; F16H 61/24; F16H 61/247; F16H 2059/0295; F16H 61/243; F16D 2011/008
See application file for complete search history.

(56) References Cited

U.S. PATENT DOCUMENTS

| | | | | |
|---|---|---|---|---|
| 6,295,887 B1* | 10/2001 | DeJonge | ................ | B60K 37/06 74/473.3 |
| 9,335,781 B2* | 5/2016 | Echegaray Martinez | ................... | G05G 1/08 |
| 2014/0007726 A1* | 1/2014 | Muraki | .................... | G05G 1/10 74/473.3 |
| 2017/0074391 A1* | 3/2017 | Tebbe | ..................... | F16H 59/08 |
| 2018/0094719 A1* | 4/2018 | Hill | ........................ | F16H 59/105 |

(Continued)

FOREIGN PATENT DOCUMENTS

| | | |
|---|---|---|
| JP | 2008-037297 A | 2/2008 |
| JP | 2013-010481 A | 1/2013 |

(Continued)

*Primary Examiner* — Jake Cook
*Assistant Examiner* — Gregory Robert Weber
(74) *Attorney, Agent, or Firm* — Roberts Calderon Safran & Cole P.C.

(57) ABSTRACT

In a shift device, contact projections of a rotation cylinder make contact with side faces of recesses of an detent plate due to an urging force so as to urge a lever toward a shift position side. The contact projections make line contact with the side faces of the recesses. This enables the contact amount between the contact projections and the side faces of the recesses to be increased, enabling the contact pressure between the contact projections and the side faces of the recesses to be lowered.

8 Claims, 5 Drawing Sheets

(56) References Cited

U.S. PATENT DOCUMENTS

| | | | |
|---|---|---|---|
| 2019/0093758 A1* | 3/2019 | Kelly | F16H 63/42 |
| 2019/0145514 A1* | 5/2019 | Cha | F16H 61/24 |
| | | | 74/473.23 |
| 2020/0191259 A1* | 6/2020 | Bagley | F16H 63/3491 |

FOREIGN PATENT DOCUMENTS

| | | | | |
|---|---|---|---|---|
| JP | 2014156153 A | * | 8/2014 | |
| WO | WO-2014198293 A1 | * | 12/2014 | F16H 61/24 |
| WO | WO-2018217865 A1 | * | 11/2018 | F16H 59/02 |

* cited by examiner

SHIFT DEVICE

CROSS-REFERENCE TO RELATED APPLICATION

This application claims priority under 35 USC 119 from Japanese Patent Application No. 2017-254801 filed Dec. 28, 2017, the disclosure of which is incorporated by reference herein.

BACKGROUND

Field of the Invention

The present disclosure relates to a shift device in which a shift body is moved to change a shift position of the shift body.

Related Art

Japanese Patent Application Laid-Open (JP-A) No. 2008-37297 discloses a column shift device in which a detent member on a column shift lever side and engagement recesses on a retention member are placed in contact by urging force of a coil spring, such that the column shift lever is urged toward an operation position side.

In this column shift device, the detent member is configured in a spherical shape and peripheral faces of the engagement recesses are configured by aspherical curved faces, such that point contact is achieved between the detent member and the peripheral faces of the engagement recesses.

SUMMARY

In consideration of the above circumstances, a shift device capable of lowering contact pressure between a contact body and a contact portion is obtained.

A shift device of a first aspect includes: a shift body that is moved with respect to a vehicle body side to change a shift position; a contact body that is provided on the vehicle body side; and a contact portion that is provided on a shift body side, and that makes line contact or surface contact with the contact body due to an urging force such that the shift body is urged toward a shift position side.

A shift device of a second aspect is the shift device of the first aspect, wherein the contact body and the contact portion are always in line contact or in surface contact when the shift body is moved between shift positions.

A shift device of a third aspect is the shift device of the first aspect or the second aspect, further including a moving section that is moved due to the shift body being moved, and that is provided with the contact portion such that the contact body and the contact portion make line contact or surface contact along a direction perpendicular to a movement direction of the moving section.

In the shift device of the first aspect, the shift body is moved with respect to the vehicle body side to change a shift position of the shift body. The contact body on the vehicle body side and the contact portion on the shift body side make contact due to the urging force so as to urge the shift body toward a shift position side.

Note that the contact body and the contact portion make line contact or surface (face-to-face) contact. This enables the contact amount between the contact body and the contact portion to be increased, enabling the contact pressure between the contact body and the contact portion to be lowered.

In the shift device of the second aspect, the contact body and the contact portion are always in line contact or in surface contact when the shift body is being moved between shift positions. This enables the contact pressure between the contact body and the contact portion to be constantly low when the shift body is being moved between shift positions.

In the shift device of the third aspect, the moving section is moved due to the shift body being moved, and the contact portion is provided at the moving section.

Note that the contact body and the contact portion make line contact or surface contact along a direction perpendicular to the movement direction of the moving section. This thereby enables appropriate line contact or surface contact to be made between the contact body and the contact portion.

BRIEF DESCRIPTION OF THE DRAWINGS

An exemplary embodiment will be described in detail with reference to the following figures, wherein.

DETAILED DESCRIPTION

Figure 1:
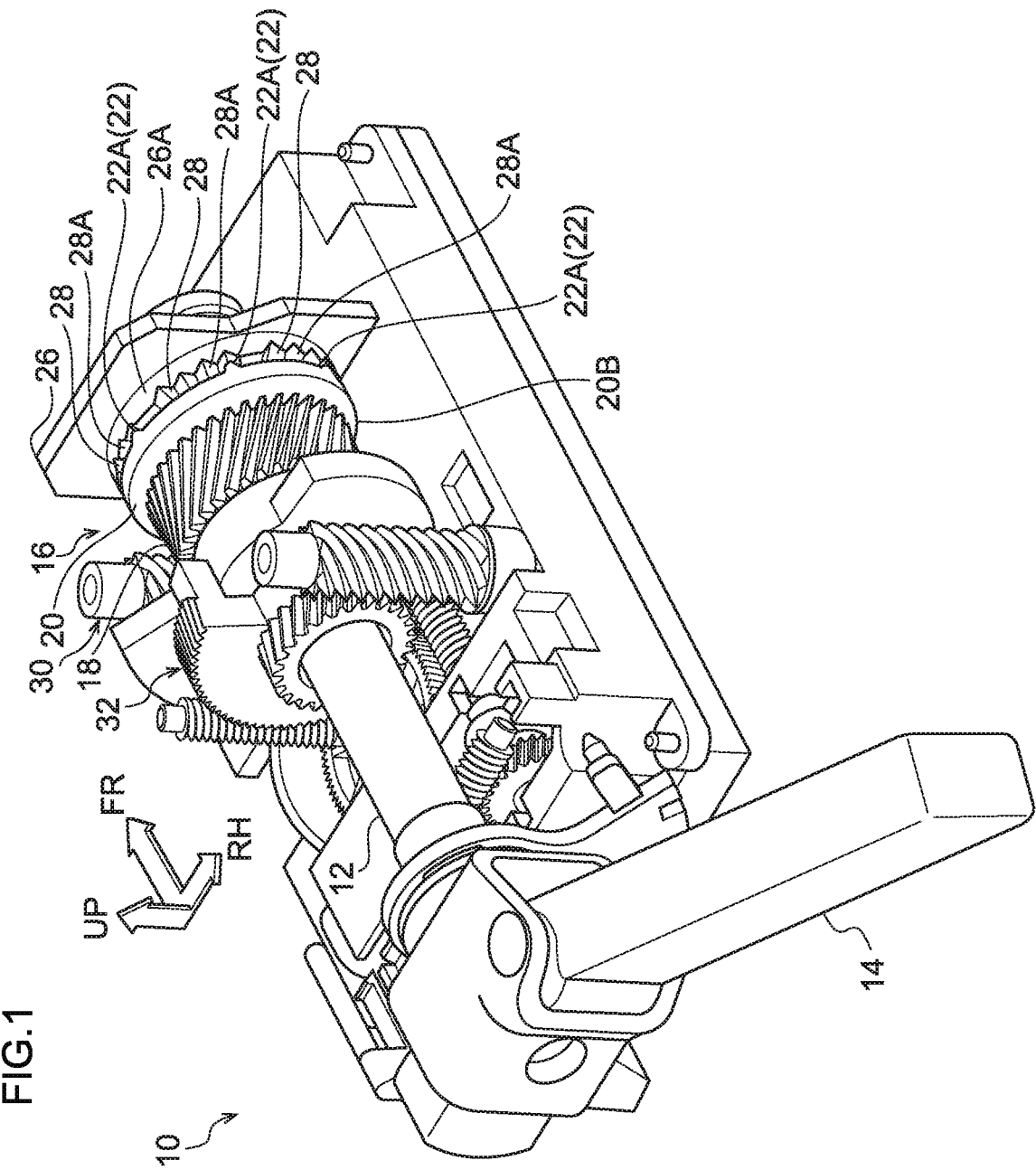
FIG. 1 is a perspective view illustrating a shift device according to an exemplary embodiment as viewed from the oblique rear right.
Figure 2:
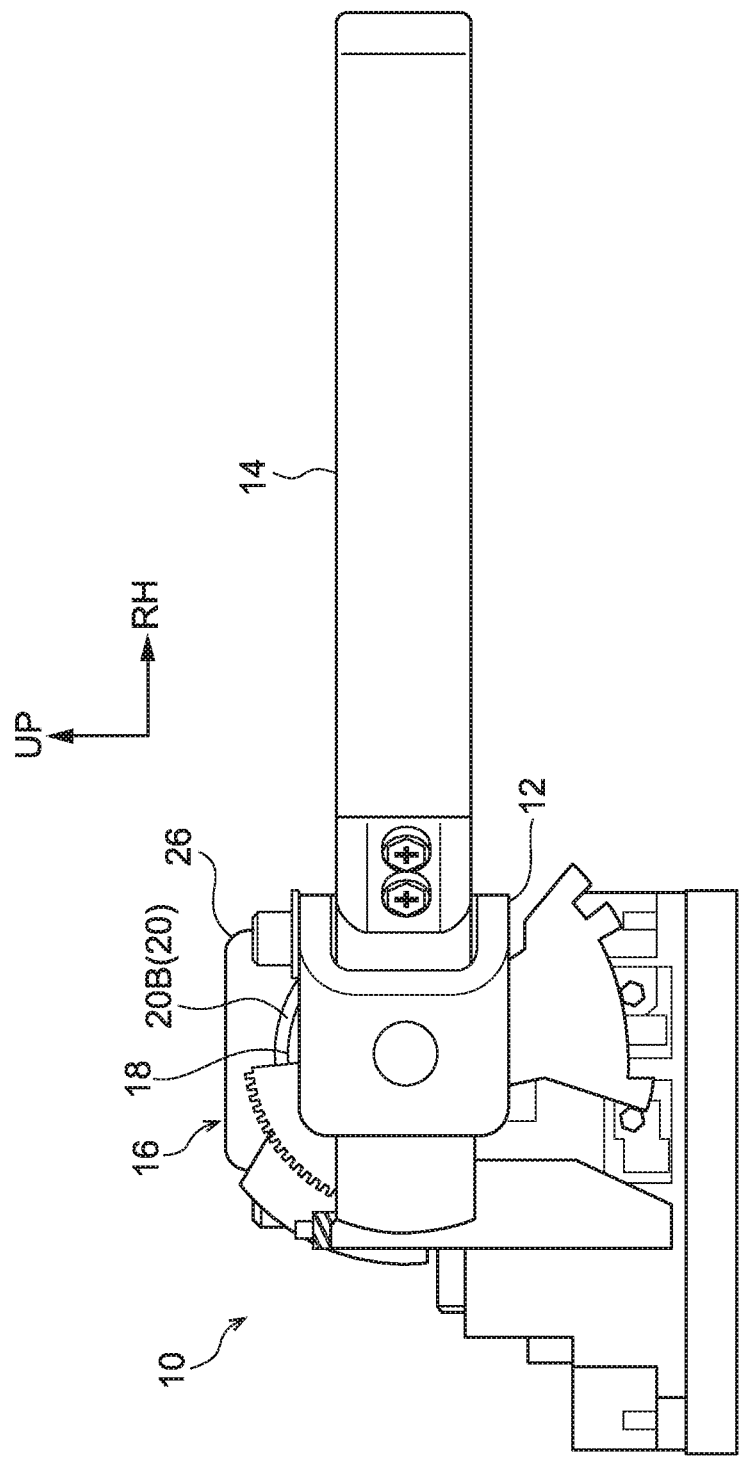
FIG. 2 is a back view illustrating a shift device according to an exemplary embodiment as viewed from the rear.

FIG. 1 is a perspective view illustrating a shift device 10 according to an exemplary embodiment as viewed from the oblique rear right. FIG. 2 is a back view illustrating the shift device 10 as viewed from the rear. In the drawings, the arrow FR indicates the front of the shift device 10, the arrow RH indicates the right of the shift device 10, and the arrow UP indicates the upper side of the shift device 10.

The shift device 10 according to the present exemplary embodiment is what is referred to as a column type shift device, and is installed to a steering column of a vehicle. The front direction, right direction, and upward direction of the shift device 10 respectively correspond to an oblique front downward direction, a right direction, and an oblique front upward direction of the vehicle.

As illustrated in FIG. 1 and FIG. 2, the shift device 10 is provided with a substantially circular column shaped rotation shaft 12, serving as a rotation section. The rotation shaft 12 is supported on a vehicle body side so as to be capable of rotating (rotating about a central axis, and moving), and is disposed such that an axial direction of the rotation shaft 12 runs parallel to the front-rear direction.

A left end portion (base end portion) of a substantially elongated rod shaped lever 14, serving as a shift body, is coupled to a rear end portion of the rotation shaft 12. The lever 14 is capable of moving rotationally (pivoting) (moving) in the up-down direction about the rotation shaft 12 as a center within a predetermined range. The lever 14 extends from the rear end portion of the rotation shaft 12 toward the right side, and extends in a vehicle cabin so as to be capable of being moved rotationally in the up-down direction. An occupant is able to move rotationally the lever 14 in the up-down direction while gripping a right end portion (leading end portion) of the lever 14. Moving rotationally operating the lever 14 from an upper side to a lower side changes a shift position of the lever 14 to, for example, a P position (parking position), an R position (reverse position), an N position (neutral position), and a D position (drive position), in this sequence. The rotation shaft 12 is rotated integrally with the lever 14 accompanying rotationally moving of the lever 14.

Figure 3:
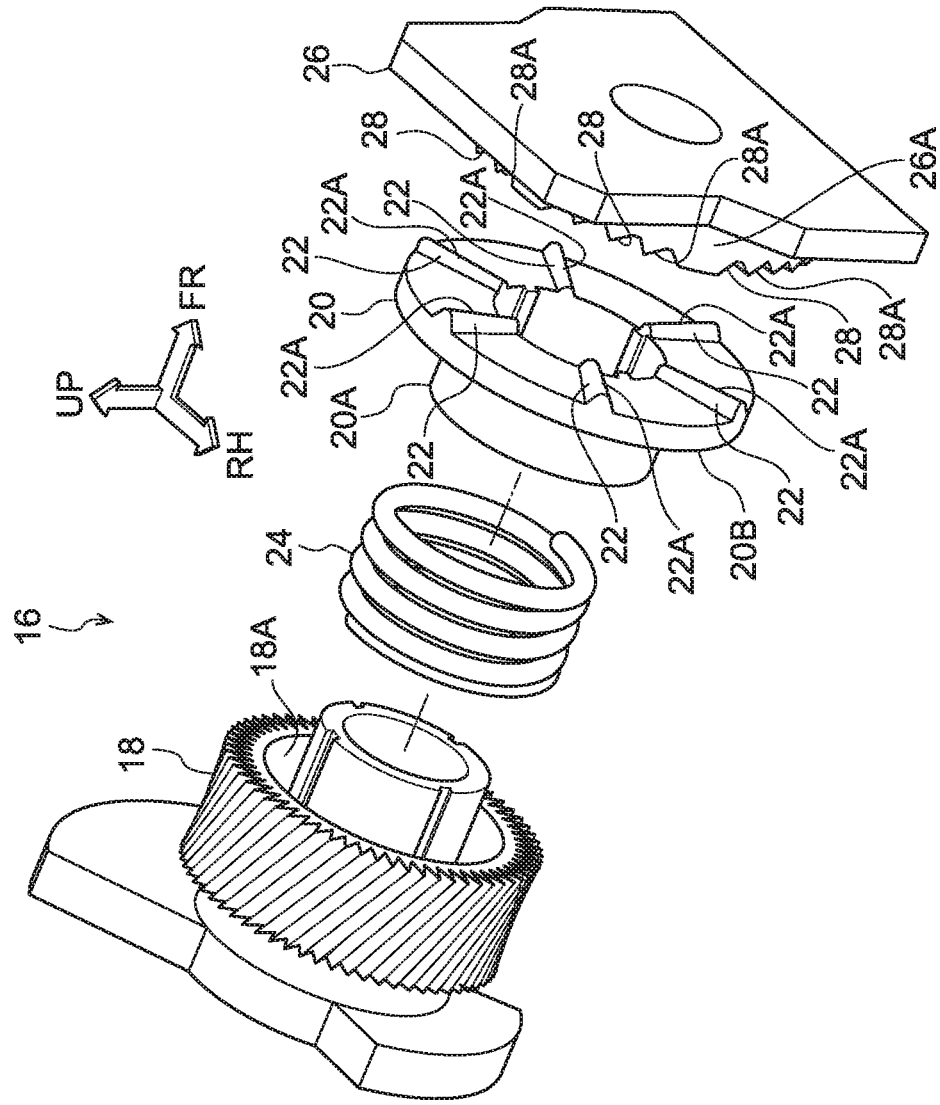
FIG. 3 is a perspective view illustrating relevant portions of a shift device according to an exemplary embodiment as viewed from the oblique front right.

An detent mechanism 16 (see FIG. 3) is provided at a front portion of the rotation shaft 12.

The detent mechanism 16 is provided with a substantially circular cylinder shaped support cylinder 18. The rotation shaft 12 passes coaxially through the interior of the support cylinder 18. The support cylinder 18 is capable of rotating as an integral unit with the rotation shaft 12, and the support cylinder 18 is restricted from moving in the front-rear direction (axial direction) with respect to the rotation shaft 12. A substantially annular support hole 18A is formed coaxially in a peripheral wall of the support cylinder 18. The support hole 18A is closed off at a rear side, and is open at a front side.

Figure 4B:
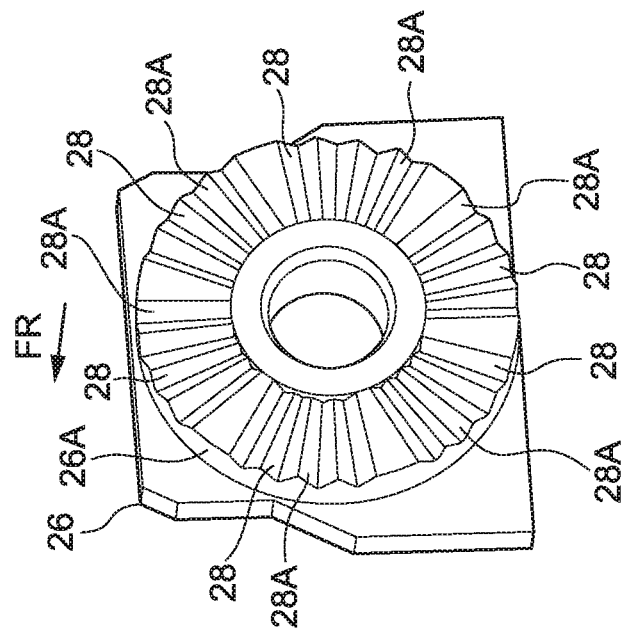
FIG. 4B is a perspective view illustrating a detent plate of a shift device according to an exemplary embodiment as viewed from the rear side.
Figure 4A:
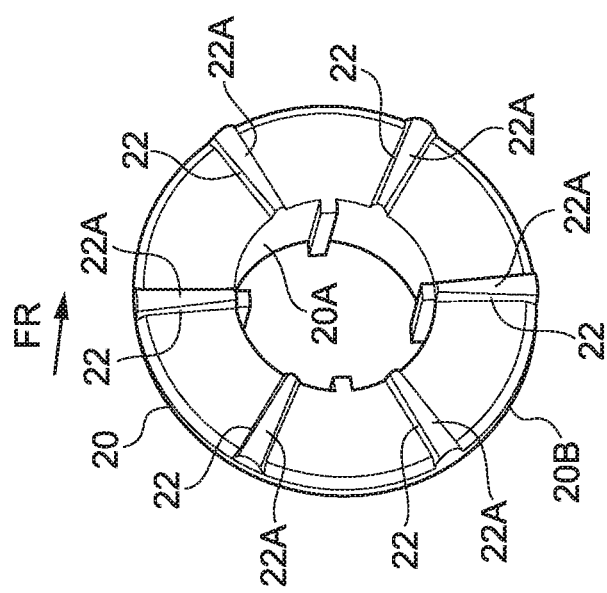
FIG. 4A is a perspective view illustrating a rotation cylinder of a shift device according to an exemplary embodiment as viewed from the front side.

A rotation cylinder 20 (see FIG. 4A), serving as a moving section, is provided at the front side of the support cylinder 18. A substantially circular cylinder shaped insertion cylinder 20A is coaxially provided at a rear side portion of the rotation cylinder 20. The insertion cylinder 20A is coaxially inserted into (fitted into) the support hole 18A in the support cylinder 18. The rotation cylinder 20 is capable of rotating as an integral unit with the support cylinder 18, and is capable of moving in the front-rear direction (axial direction) with respect to the support cylinder 18. An annular disc shaped rotation plate 20B is coaxially provided to a front portion of the rotation cylinder 20. The rotation plate 20B projects toward a radial direction outside with respect to the insertion cylinder 20A.

Plural, substantially semicircular column shaped contact projections 22 (six in the present exemplary embodiment), serving as a contact portion, are integrally provided to a front face of the rotation plate 20B. The plural contact projections 22 are disposed at uniform spacings therebetween around the circumferential direction of the rotation plate 20B. The contact projections 22 project toward the front side, and the contact projections 22 extend in radial directions of the rotation plate 20B (radial directions of the rotation shaft 12). A front side face of each of the contact projections 22 configures a contact face 22A. Each of the contact faces 22A is curved with a convex profile toward the front side, and is disposed running along a radial direction of the rotation plate 20B.

A detent spring 24 (compression coil spring), serving as an urging member, is provided between the support cylinder 18 and the rotation cylinder 20. The detent spring 24 spans between a rear face (bottom face) of the support hole 18A in the support cylinder 18 and a rear face of the insertion cylinder 20A of the rotation cylinder 20, and urges the rotation cylinder 20 toward the front side.

A substantially rectangular plate shaped detent plate 26 (see FIG. 4B), serving as a contact body, is provided at the front side of the rotation cylinder 20. The detent plate 26 is fixed to the vehicle body side, and the rotation shaft 12 passes through the detent plate 26 so as to be capable of rotating. A rear face of the detent plate 26 is integrally provided with a substantially annular disc shaped detent projection 26A, serving as a contacted portion. The detent projection 26A projects toward the rear side and is disposed coaxially with the rotation shaft 12.

Plural detent faces 28 (six in the present exemplary embodiment), serving as contacted faces, are integrally formed to rear face of the detent projection 26A. The plural detent faces 28 are disposed at uniform spacings therebetween around the circumferential direction of the detent projection 26A. Each of the detent faces 28 is formed with plural recesses (concave portions) 28A (four in the present exemplary embodiment) that have triangular cross-section profiles. The plural recesses 28A of each of the detent faces 28 are arranged contiguously to each other (continuously) around the circumferential direction of the detent projection 26A. The recesses 28A extend in radial directions of the detent projection 26A (radial directions of the rotation shaft 12), and side faces of the recesses 28A (peripheral faces, including apex faces of protrusions between the recesses 28A) are disposed running along radial directions of the detent projection 26A. The side faces of the recesses 28A are contacted by the contact faces 22A of the contact projection 22 of the rotation cylinder 20 due to the urging force of the detent spring 24, such that the contact projections 22 are urged toward bottom side of the recesses 28A, and the lever 14 is urged toward a shift position side through the support cylinder 18 and the rotation shaft 12.

A detection device 30 is mechanically connected to the support cylinder 18 of the detent mechanism 16. The detection device 30 detects the rotation position of the support cylinder 18, and thereby detects the rotationally moving position of the rotation shaft 12. In this manner, the rotation position of the lever 14 is detected so as to detect the shift position of the lever 14.

A drive device 32 is capable of forming a mechanical connection with the support cylinder 18 of the detent mechanism 16. In a state in which the lever 14 is disposed other than the P position, at a predetermined case (for example when a vehicle engine is turned off), the drive device 32 rotates the support cylinder 18, thereby rotating the rotation shaft 12 such that the lever 14 is moved rotationally toward the upper side, and the lever 14 is moved rotationally (returned) to the P position.

Explanation follows regarding operation of the present exemplary embodiment.

In the shift device 10 configured as described above, when the lever 14 is disposed at each shift position, the contact projections 22 of the rotation cylinder 20 (rotation plate 20B) are inserted into the recesses 28A of the detent plate 26 (detent faces 28 of the detent projection 26A) under the urging force of the detent spring 24, thereby retaining the lever 14 at the respective shift position.

When the lever 14 is moving-rotationally-operated in the up-down direction between shift positions, the rotation shaft 12, the support cylinder 18, and the rotation cylinder 20 are rotated as an integral unit with the moving rotationally lever 14. After the contact projections 22 leave the recesses 28A against the urging force of the detent spring 24, the contact projections 22 are inserted into recesses 28A on the rotation direction side of the rotation cylinder 20 of the recesses 28A by the urging force of the detent spring 24. Accordingly, a rotation-resisting force acts on the rotation cylinder 20 with respect to the detent plate 26 such that a moving rotationally resisting force acts on the moving rotationally operation of the lever 14, thereafter, a rotation-assisting force acts on the rotation cylinder 20 with respect to the detent plate 26 such that the moving rotationally assisting force acts on the moving rotationally operation of the lever 14, so as to produce an detent (indexing) sensation during the moving rotationally operation of the lever 14.

Note that since the right end portion (leading end portion) of the lever 14 is a large distance from the rotation cylinder 20 in a radial direction of the rotation cylinder 20, moving rotationally operation load (moving rotationally resisting force) at the right end portion of the lever 14 is smaller than the rotation-resisting force on the rotation cylinder 20 (rotation plate 20B) with respect to the detent plate 26 (detent projection 26A). There is accordingly a need to increase the rotation-resisting force on the rotation cylinder 20 with respect to the detent plate 26 in order to secure moving rotationally operation load at the right end portion of the lever 14.

Figure 5A:
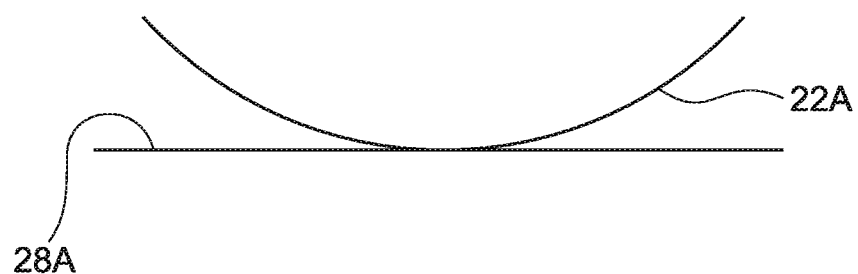
FIG. 5A is a view illustrating line contact of the rotation cylinder and detent plate of a shift device according to an exemplary embodiment as viewed along a radial direction.

Note that the contact faces 22A of the contact projections 22 of the rotation cylinder 20 make line contact with the side faces of the recesses 28A of the detent plate 26 (see FIG. 5A). This enables the contact amount between the contact faces 22A of the contact projections 22 and the side faces of the recesses 28A to be increased. Accordingly, the rotation-resisting force of the rotation cylinder 20 with respect to the detent plate 26 can be increased, thereby enabling moving rotationally operation load to be secured at the right end portion of the lever 14. Moreover, contact pressure between the contact faces 22A of the contact projections 22 and the side faces of the recesses 28A can be lowered, enabling improved durability of the contact projections 22 and the recesses 28A. Moreover, since the contact amount between the contact faces 22A of the contact projections 22 and the side faces of the recesses 28A can be increased without increasing the size of the detent plate 26 (detent projection 26A) and the rotation cylinder 20 (rotation plate 20B), an increase in the size of the detent plate 26 (detent projection 26A) and the rotation cylinder 20 (rotation plate 20B) can be suppressed.

The contact faces 22A of the contact projections 22 of the rotation cylinder 20 and the side faces of the recesses 28A of the detent plate 26 are arranged running along radial directions (rotation-radial directions, rotation-perpendicular directions) of the rotation cylinder 20, and the contact faces 22A of the contact projections 22 make line contact with the side faces of the recesses 28A along radial directions (rotation-radial directions) of the rotation cylinder 20. This thereby enables appropriate line contact to be made between the contact faces 22A of the contact projections 22 and the side faces of the recesses 28A, enabling the contact amount between the contact faces 22A of the contact projections 22 and the side faces of the recesses 28A to be increased appropriately.

The contact faces 22A of the contact projections 22 of the rotation cylinder 20 always line contact (maintain constant line contact) with the side faces of the recesses 28A of the detent plate 26 when the lever 14 is being moving rotationally operated between shift positions (including when the lever 14 is being disposed at a shift position). Accordingly, a large rotation-resisting force on the rotation cylinder 20 with respect to the detent plate 26 can be always maintained when the lever 14 is being moving rotationally operated between shift positions, enabling the moving rotationally operation load at the right end portion of the lever 14 to be effectively secured, and enabling contact pressure between the contact faces 22A of the contact projections 22 and the side faces of the recesses 28A to be always lowered, thereby enabling an effective improvement in the durability of the contact projections 22 and the recesses 28A.

Moreover, plural of the contact projections 22 are provided at the rotation cylinder 20, and plural of the detent faces 28 are provided at the detent plate 26. This thereby enables the contact amount between the rotation cylinder 20 and the detent plate 26 to be increased. The rotation-resisting force of the rotation cylinder 20 with respect to the detent plate 26 can thus be increased effectively, so, the moving rotationally operation load at the right end portion of the lever 14 can be secured effectively. Moreover, the contact pressure between the contact faces 22A of the contact projections 22 and the side faces of the recesses 28A can be effectively lowered, enabling an effective improvement in the durability of the contact projections 22 and the recesses 28A. Moreover, since the contact amount between the rotation cylinder 20 and the detent plate 26 can be increased without increasing the size of the detent plate 26 (detent projection 26A) and the rotation cylinder 20 (rotation plate 20B), an increase in the size of the rotation cylinder 20 (detent projection 26A) and the rotation cylinder 20 (rotation plate 20B) can be effectively suppressed.

Figure 5B:
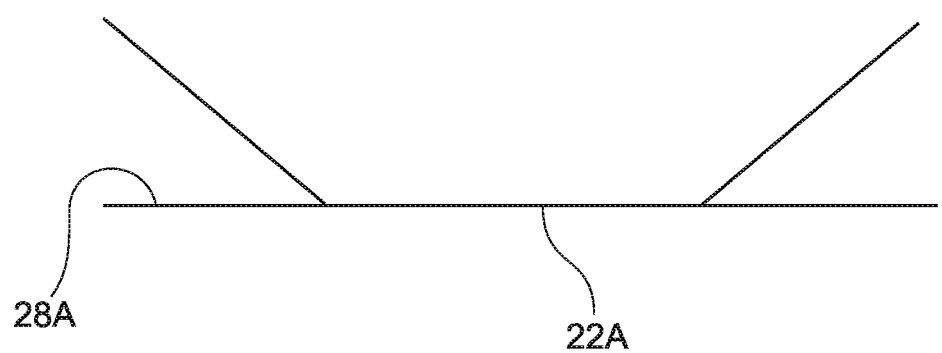
FIG. 5B is a view illustrating surface contact of the rotation cylinder and detent plate of a shift device according to an exemplary embodiment as viewed along the radial direction.

Note that in the present exemplary embodiment, the contact faces 22A of the contact projections 22 of the rotation cylinder 20 make line contact with the side faces of the recesses 28A of the detent plate 26. However, configuration may be made in which the contact faces 22A of the contact projections 22 of the rotation cylinder 20 make surface contact with the side faces of the recesses 28A of the detent plate 26 (see FIG. 5B), at least for a time when the lever 14 is being moving rotationally operated between shift positions (including a time when the lever 14 is being disposed at a shift position).

Moreover, in the present exemplary embodiment, plural of the contact projections 22 are provided at the rotation cylinder 20, and plural of the detent faces 28 are provided at the detent plate 26. However, configuration may be made in which a single contact projection 22 is provided at the rotation cylinder 20, and a single detent face 28 is provided at the detent plate 26.

Moreover, in the present exemplary embodiment, plural of the recesses 28A are provided at each of the detent faces 28 of the detent plate 26. However, configuration may be made in which a single recess 28A is provided at each of the detent faces 28 of the detent plate 26. In such a case, for example, the lever 14 is urged toward a predetermined shift position (for example the P position) from each shift position other than the predetermined shift position.

Moreover, in the present exemplary embodiment, the contact projections 22 are provided to the rotation cylinder 20, and the detent faces 28 are provided to the detent plate 26. However, configuration may be made in which the detent faces 28 are provided to the rotation cylinder 20, and the contact projections 22 are provided to the detent plate 26.

Moreover, in the present exemplary embodiment, the rotation cylinder 20 is capable of moving with respect to the lever 14 side and is urged, and the detent plate 26 is fixed to the vehicle body side. However, configuration may be made in which the rotation cylinder 20 is fixed to the lever 14 side, and the detent plate 26 is capable of moving with respect to the vehicle body side and is urged.

Moreover, in the present exemplary embodiment, the lever 14 (shift body) is moved rotationally. However, the shift body may be rotated (rotated about an axial center) or may slide.

Moreover, in the present exemplary embodiment, the rotation cylinder 20 is rotated with respect to the detent plate 26. However, configuration may be made in which the rotation cylinder 20 is moved rotationally or slides with respect to the detent plate 26.

Moreover, in the present exemplary embodiment, the shift device 10 is installed to the steering column. However, the shift device 10 may be installed to a vehicle cabin floor, an instrument panel, or a console.

What is claimed is:

1. A shift device comprising:
    a shift body that is configured to rotate with respect to a vehicle body side about an axis of rotation of the shift body to change a shift position;
    a contact body that is fixed on the vehicle body side with no relative movement between the contact body and the vehicle body side; and
    a contact member that is provided on a shift body side and configured to rotate integrally with the shift body about the axis of rotation of the shift body with no relative rotation between the contact member and the shift body, that faces the contact body in a direction along the axis of rotation of the shift body,
    wherein:
    a projection portion projects in the direction along the axis of rotation of the shift body, and is formed integrally at one of the contact body or the contact member with no relative movement between the projection portion and the one of the contact body or the contact member,
    a recess portion is recessed in the direction along the axis of rotation of the shift body, and is formed at the other of the contact body or the contact member,
    the projection portion and recess portion are configured to face in the direction along the axis of rotation of the shift body, the projection portion and recess portion make line contact or surface contact due to an urging force in the direction along the axis of rotation of the shift body such that the shift body is urged toward a shift position side,
    the projection portion extends along a radial direction of rotation of the shift body relative to the axis of rotation of the shift body, a length of the projection portion in the radial direction is longer than a width of the projection portion along a circumferential direction of rotation of the shift body, and
    the recess portion extends along the radial direction relative to the axis of rotation of the shift body, a length of the recess portion in the radial direction is longer than a width of the recess portion along the circumferential direction.

2. The shift device of claim 1, wherein the shift body is configured to rotate to change the shift position among a plurality of shift positions for one projection portion, the recess portions of the plural number are formed continuously along the circumferential direction at the other of the contact body or the contact member such that the one projection portion is configured to move in the continuously formed recess portions.

3. The shift device of claim 1, wherein the contact member is slidably moveable over the contact body when the projection portion and recess portion are in line or surface contact due to the urging force so as to form a detent mechanism.

4. The shift device of claim 1, wherein the projection portion is received within the recess portion as a result of the urging force, and, when the shift body is moved to change the shift position, the contact member is rotated with respect to the fixed contact body such that the projection portion leaves the recess portion, and enters in another recess portion due to the urging force.

5. The shift device of claim 1, wherein
    a contact body face is formed at the contact body and a contact member face is formed at the contact member, the contact body face and the contact member face facing each other in the direction along the axis of rotation of the shift body,
    the projection portion is formed integrally at one of the contact body face or the contact member face with no relative movement between the projection portion and the one of the contact body face or the contact member face, and
    the recess portion is recessed in the direction along the axis of rotation, and is formed at the other of the contact body face or the contact member face.

6. The shift device of claim 5, wherein the contact body face and the contact member face are faces orthogonal to the axis of rotation of the shift body.

7. The shift device of claim 5, wherein the width of the projection portion along the circumferential direction becomes longer on progressing from a side of the axis of rotation of the shift body toward an outside in the radial direction of rotation of the shift body, and the width of the recess portion along the circumferential direction becomes longer on progressing from the side of the axis of rotation of the shift body toward the outside in the radial direction of rotation of the shift body.

8. The shift device of claim 6, wherein the width of the projection portion along the circumferential direction becomes longer on progressing from a side of the axis of rotation of the shift body toward an outside in the radial direction of rotation of the shift body, and the width of the recess portion along the circumferential direction becomes longer on progressing from the side of the axis of rotation of the shift body toward the outside in the radial direction of rotation of the shift body.

* * * * *